(12) United States Patent
Wu et al.

(10) Patent No.: US 12,287,737 B2
(45) Date of Patent: Apr. 29, 2025

(54) METHOD AND SYSTEM OF USING HMB AS A CACHE OF PHYSICAL ADDRESS MAPPING TABLE

(71) Applicant: INNOGRIT TECHNOLOGIES CO., LTD., Shanghai (CN)

(72) Inventors: Jian Wu, Shanghai (CN); Dishi Lai, Shanghai (CN); Yu Zhao, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 18/365,817

(22) Filed: Aug. 4, 2023

(65) Prior Publication Data

US 2024/0070081 A1 Feb. 29, 2024

(30) Foreign Application Priority Data

Aug. 25, 2022 (CN) .......................... 202211027123.5

(51) Int. Cl.
*G06F 12/0873* (2016.01)
(52) U.S. Cl.
CPC ................ *G06F 12/0873* (2013.01)
(58) Field of Classification Search
CPC .................................................. G06F 12/0873
See application file for complete search history.

(56) References Cited

U.S. PATENT DOCUMENTS

| | | | |
|---|---|---|---|
| 2019/0266079 A1* | 8/2019 | R | G06F 3/0656 |
| 2020/0117525 A1* | 4/2020 | Kachare | G06F 13/4221 |
| 2022/0334920 A1* | 10/2022 | Ho | G06F 11/0727 |
| 2023/0152988 A1* | 5/2023 | Lee | G06F 3/0637 |
| | | | 711/154 |

* cited by examiner

*Primary Examiner* — Prasith Thammavong
(74) *Attorney, Agent, or Firm* — HSML P. C.

(57) ABSTRACT

This application discloses a method and system of using HMB as a cache of physical address mapping table. The method comprises: arranging physical addresses in order of logical addresses, physical mapping entries corresponding to a plurality of consecutive physical addresses form one table unit, and a logical address corresponding to a first entry of each table unit is used as an index of the table unit; determining HMB size, dividing all table units into a plurality of sections according to the HMB size, each section comprises a plurality of table units, each section is divided into a plurality of ways; calculating a metadata according to logical address corresponding to the first entry of the table unit to be stored and the HMB size, the metadata comprises a section number and a way number; writing the metadata and the table unit to be stored into the HMB. This application uses HMB as L2P address mapping table cache of SSD controller, saving or avoiding use cost of DRAM on SSD, and reducing SSD size.

12 Claims, 3 Drawing Sheets

METHOD AND SYSTEM OF USING HMB AS A CACHE OF PHYSICAL ADDRESS MAPPING TABLE

CROSS-REFERENCE TO PRIOR APPLICATION

This application claims priority to Chinese Application number CN202211027123.5 which is filed on Aug. 25, 2022, the contents of which are incorporated herein by reference.

TECHNICAL FIELD

This disclosure relates to the storage technical field of solid-state drive, and more specifically to a method and system of using HMB (Host Memory Buffer) as the cache of storage device physical address mapping table.

BACKGROUND

During read and write process of a non-volatile storage device, logical block addresses (LBAs) used in a host need to be converted to physical data addresses in the storage device via an address translation layer. For SSD storage devices based on NAND flash memory technology, this translation layer is called as Flash Translation Layer (FTL). An address mapping table is saved in the FTL to represent the correspondence (L2P) between the logical addresses and physical addresses of NAND. Through the table, read and write access to data on the NAND is realized. In traditional SSD architecture, the L2P mapping table is usually stored on DRAM or NAND in the SSD device. DRAM has short access latency, but the use of DRAM increases the manufacturing cost of the SSD. On the other hand, NAND has large access latency, which may affect SSD performance.

The Non-Volatile Memory Express (NVMe) specification defines HMB protocol which allocates part of the host's memory space to be used by the solid-state drive controller (SSD host controller). SSD host controller can use this part of memory space to store the L2P mapping table. The access latency of the HMB is usually between DRAM and NAND, providing a cost and performance solution for L2P storage. The SSD host controller accesses the HMB space via a host interface, such as PCIe interface, on the device to access and manage the L2P mapping table. Due to the limitation of host memory resources, the memory space allocated to HMB may not be enough to store the entire L2P mapping table. Therefore, the HMB is usually used as a buffer of the L2P mapping table to store frequently used L2P entries, while the entire mapping table is stored on the NAND. When the SSD reads the NAND, it needs to obtain the corresponding L2P entry in the L2P mapping table, which can be obtained by reading the HMB. If the corresponding entry is not found in the HMB, then search it on the NAND.

For frequently used L2P entries, the corresponding data is usually called as hot data. Conversely, for infrequently used L2P entries, the corresponding data is called as cold data. Storing the L2P entries corresponding to the hot data into the HMB can improve the overall access performance to the L2P mapping table. During the use of the SSD, as the application scenarios change, cold and hot data will also change continuously. Cold data may become hot data, and hot data may also become cold data. Therefore, the L2P entries in the HMB also need to be updated continuously.

SUMMARY OF THE INVENTION

An object of this disclosure is to provide a method and system of using HMB as the cache of storage device physical address mapping table, which defines a management scheme for the L2P mapping table according to the use characteristics of the HMB for L2P entries, and realizes fast reading, writing, searching and real-time updating of the L2P mapping entries in the HMB.

This application discloses a method of using HMB as physical address mapping table cache, the method may comprise the following steps:

arranging physical addresses in the order of logical addresses, wherein physical address mapping entries corresponding to a plurality of consecutive physical addresses form one table unit, and a logical address corresponding to a first entry of each table unit is used as an index of the table unit;

determining HMB size, and dividing all table units into a plurality of sections according to the HMB size, wherein each section comprises a plurality of table units, and each section is divided into a plurality of ways;

calculating a metadata according to logical address corresponding to the first entry of the table unit to be stored and the HMB size, wherein the metadata comprises a section number and a way number, the section number is the modulo result of dividing the logical address by the HMB size, a remainder of the modulo result is the offset-in-section, and the way number is the modulo result of dividing the offset-in-section by way size; and writing the metadata and the table unit to be stored into the HMB.

In some embodiments, the metadata further comprises a write sequence number which indicates a write order of the metadata, and when writing the metadata and the table unit to be stored into the HMB, replacing the metadata in the HMB corresponding to the write sequence number which indicates earliest written and the table unit corresponding to the metadata, and updating the write sequence numbers of all metadata.

In some embodiments, the write sequence number comprises {0, 1, 2, 3}, wherein 0 indicates that the metadata is earliest written and will be replaced at the next time of writing, and 3 indicates that the metadata is most recently written.

In some embodiments, the metadata further comprises a write sequence number which indicates a write order of the metadata, and when writing the metadata and the table unit to be stored into the HMB, specifying to replace the metadata in the HMB corresponding to a specific way number and the table unit corresponding to the metadata, and updating the write sequence numbers of all metadata.

In some embodiments, updating the write sequence number of the metadata corresponding to the specified specific way number to a write sequence number which indicates the metadata is most recently written, and decreasing the write sequence number corresponding to the metadata written later than the metadata corresponding to the specified specific way number by 1 respectively, and keeping the write sequence number corresponding to the metadata written earlier than the metadata corresponding to the specified specific way number unchanged.

In some embodiments, generating metadata according to the logical address corresponding to a mapping entry to be searched or read or the logical address corresponding to the first entry of the table unit to be searched or read, and searching the metadata in the HMB, and returning the mapping entry corresponding to the metadata while there being a matching metadata.

In some embodiments, the HMB is divided into a plurality of subspaces corresponding to different namespaces, wherein each subspace of the HMB comprises a plurality of storage logic subblocks for storing metadata, table units, user data, and data integrity check code.

In some embodiments, the HMB is divided into a plurality of subspaces corresponding to different namespaces, and the step of writing the metadata and the table unit to be stored into the HMB further comprises: determining the data corresponding to the metadata and the table unit to be stored is cold data or hot data, storing the metadata and the table units to be stored in the subspaces of different namespaces according to the determining result of the cold data and the hot data, and dividing the subspace used to store the entire table units to be stored corresponding to the hot data into one section, such that search hit rate of the hot data can reach 100%.

In some embodiments, physical address entries corresponding to 1024 consecutive physical addresses form one table unit.

In some embodiments, all the table units are divided into 1, 128 or 256 sections.

In some embodiments, each section is divided into 4, 8, or 6 ways.

This application also discloses a system of using HMB as physical address mapping table cache, the system may comprise:

a mapping table division module, configured to arrange physical addresses in the order of logical addresses, wherein physical address mapping entries corresponding to a plurality of consecutive physical addresses form one table unit, and a logical address corresponding to a first entry of each table unit is used as an index of the table unit;

table unit division module, configured to determine HMB size, and divide all table units into a plurality of sections according to the HMB size, wherein each section comprises a plurality of table units, and each section is divided into a plurality of ways;

metadata calculation module, configured to calculate a metadata according to logical address corresponding to the first entry of the table unit to be stored and the HMB size, wherein the metadata comprises a section number and a way number, the section number is equal to a modulo result of dividing the logical address by the HMB size, and the way number is equal to a remainder of the modulo result divided by the number of ways; and write module, configured to write the metadata and the table unit to be stored into the HMB.

The application also discloses a computer readable storage medium which stores computer executable instructions, and the computer executable instructions are executed by the processor to implement the steps in the method described above.

Compared with the prior art, this application has at least the following beneficial effects:

This scheme uses the HMB as the address mapping table cache of the SSD, which can replace the traditional DRAM-based address mapping table buffer scheme, saving or avoiding the use cost of DRAM on the SSD, and reducing the size of SSD.

Arrange the L2P mapping entries in the order of LDA, and divide the HMB into a plurality of sections according to the HMB size, which solves the problem that the entire L2P table cannot be covered when the HMB space is insufficient.

Define data structure of L2P mapping table unit. Hardware (HW) calculates and searches the metadata, which greatly improves management efficiency of the HMB cache and supports various LBA formats and NAND storage cells.

Define operation instructions for reading, writing, searching and replacing the HMB cache entries, so that software (FW) can manage contents of the HMB cache via the provided LDA. Define the result of HW's operation on the HMB cache as interface of the FW. Define replacement mechanism of the HMB entries: realizing the flexibility of table management by replacing the entry based on the age of the entries, or in the order specified by FW.

Divide the entire HMB space into a plurality of subspaces, and manage the HMB in subspaces, which improves the utilization rate of the HMB space, enables the HMB to support a plurality of namespaces for various storage purposes, so as to support different application scenarios at the same time and realize real-time change of hot and cold data.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, numerous technical details are set forth in order to provide the reader with a better understanding of the present application. However, those skilled in the art can understand that the technical solutions claimed in the present application can be implemented without these technical details and various changes and modifications based on the following embodiments.

The following is a summary of some of the innovations in the implementation of this application:

This disclosure designs a management scheme that uses HMB as a cache for SSD address mapping table. This scheme divides the L2P mapping table into table units, uses the starting LDA as an index of each L2P table unit, and calculates a metadata according to the starting LDA and the HMB size, so as to realize the management and search of the L2P table units by hardware (HW). In addition, this scheme realizes the operation of reading, writing, searching and replacing HMB cache entries by the control of software (FW). The hardware automatically calculates the HMB address, metadata and metadata address of the L2P table unit via the starting LDA provided by the software, and operates the corresponding L2P address mapping entry and metadata to realize the cache management of the L2P address mapping table. For metadata operations, various entry replacement rules are supported. At the same time, this scheme also realizes subspace of HMB and supports multiple namespaces.

In order to make the objects, technical solutions and advantages of the present application clearer, embodiments of the present application will be further described in detail below with reference to the accompanying drawings.

Figure 1:
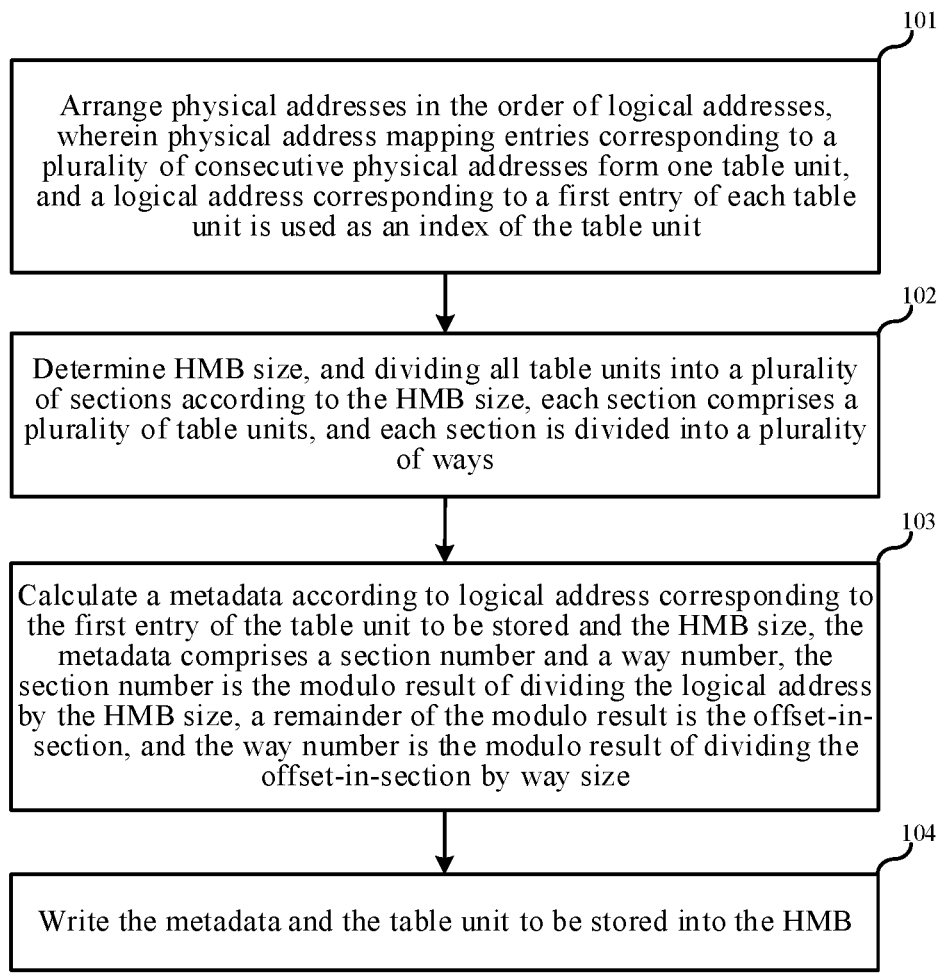
FIG. 1 is a schematic flowchart of a method of HMB caching physical address mapping table in one embodiment of the present application.

This application discloses a method of using HMB as the cache of physical address mapping table, and FIG. 1 shows a flowchart of a method of HMB caching L2P address mapping table in an embodiment. The method comprises the following steps:

Step 101, arranging physical addresses in the order of logical addresses, wherein physical address mapping entries corresponding to a plurality of consecutive physical addresses form one table unit, and a logical address corresponding to the first entry of table unit is used as an index of the table unit. In one embodiment, physical address mapping entries corresponding to 1024 consecutive physical addresses form one table unit.

Step 102, determining HMB size, and dividing all table units into a plurality of sections according to the HMB size, wherein each section comprises a plurality of table units, and each section is divided into a plurality of ways. In one embodiment, all table units are divided into 1, 128, or 256 sections. In one embodiment, each section is divided into 4, 8 or 6 ways.

Step 103, calculating a metadata according to logical address corresponding to the first entry of the table unit to be stored and the HMB size, wherein the metadata comprises a section number and a way number, the section number is the modulo result of dividing the logical address by the HMB size, the remainder of the modulo result is the offset-in-section, and the way number is the modulo result of dividing the offset-in-section by way size.

Step 104, writing the metadata and the table unit to be stored into the HMB.

In one embodiment, the metadata further comprises a write sequence number which indicates a write order of the metadata, and when writing the metadata and the table unit to be stored into the HMB, replacing the metadata in the HMB corresponding to the write sequence number which indicates the metadata is earliest written and the table unit corresponding to the metadata, and updating the write sequence numbers of all metadata. For example, the write sequence number includes {0, 1, 2, 3}, 0 to 3 sequentially represents the write order of metadata. Wherein 0 indicates that the metadata is earliest written and will be replaced at the next time of writing, and 3 indicates that the metadata is most recently written.

In another embodiment, when writing the metadata and the table unit to be stored into the HMB, specifying to replace the metadata in the HMB corresponding to a specific way number and the table unit corresponding to the metadata, and updating the write sequence numbers of all metadata. Updating the write sequence number of the metadata corresponding to the specified specific way number to a write sequence number which indicates the metadata is most recently written, and decreasing the write sequence number corresponding to the metadata written later than the metadata corresponding to the specified specific way number by 1 respectively, and keeping the write sequence number corresponding to the metadata written earlier than the metadata corresponding to the specified specific way number unchanged.

In one embodiment, generating metadata according to the logical address corresponding to a mapping entry to be searched or read or the logical address corresponding to the first entry of the table unit to be searched or read, and searching the metadata in the HMB, and returning the mapping entry corresponding to the metadata while there being a matching metadata.

In one embodiment, dividing the HMB into a plurality of subspaces corresponding to different namespaces, wherein each subspace of the HMB comprises a plurality of storage logic subblocks for storing metadata, table units, user data, and data integrity check code.

In one embodiment, when writing the metadata and the table unit to be stored into the HMB, determining the data corresponding to the metadata and the table unit to be stored is cold data or hot data, storing the metadata and the table unit to be stored in the subspaces of different namespaces according to the determining result of the cold data and the hot data, and dividing the subspace used to store the metadata and the table unit to be stored corresponding to the hot data into one section to improve the search hit rate of hot data, and the hit rate can be as high as 100%.

In order to better understand the technical solutions of this specification, the following description will be given with a specific embodiment. The details listed in this embodiment are mainly for ease of understanding and are not intended to limit the scope of protection of this application.

The NVMe express specifies that non-volatile memory supports various logical block (LB) sizes, such as 512 Byte, 4 KB, etc. The logical block is the smallest addressable data unit for read and write commands. The logical block address is called as LBA.

Each L2P entry is 32 bits, which is the physical storage unit address of NAND flash memory, that is, the physical address (PDA). The size of a physical storage unit of NAND flash memory is usually 4 KB, 8 KB, etc. At the same time, each L2P entry also corresponds to a logical address, called as logical data unit address (LDA). PDAs are arranged in LDA order, each PDA is used as one entry of the L2P mapping table, and LDA is used as an index of the table, thus realizing the conversion from LDA to PDA. In this application, in order to facilitate the management of L2P entries and improve the efficiency of read and write operations, a certain number of continuous LDA s form one table unit. The storage space occupied by each table unit is equal, and the LDA of its first entry is called the starting logical address (SLDA), which can be used as the index of this table unit. Read, write and search operations of the L2P entries are performed in unit of the table unit to improve the efficiency of the operations.

Take 512 Byte logical block and 4 KB flash memory physical space as an example, the composition of L2P entry is shown in Table 1 below.

TABLE 1

Composition of L2P entry

| Entry Index-Logical Data Unit Address (LDA) | Entry Content-Physical Address (PDA) | Description |
|---|---|---|
| 0 | Physical addresses of logical block addresses 0~7 | The physical address of LDA_0, pointing to 4 KB data |
| 1 | Physical addresses of logical block addresses 8~15 | The physical address of LDA_1, pointing to 4 KB data |
| ... | ... | ... |
| 1023 | Physical addresses of logical block addresses 8184~8191 | The physical address of the LDA_1023, pointing to 4 KB data |
| ... | ... | ... |
| N | Physical address of logical block address 8N~(8N + 7) | The physical address of LDA_N, pointing to 4 KB data |
| ... | ... | ... |

Taking 4 KB logical block and 8 KB flash memory physical space as an example, the composition of L2P entry is shown in Table 2 below.

TABLE 2

Composition of L2P entry

| Entry Index-Logical Data Unit Address (LDA) | Entry Content-Physical Address (PDA) | Description |
|---|---|---|
| 0 | Physical addresses of logical block addresses 0~1 | The physical address of LDA_0, pointing to 8 KB data |
| 1 | Physical addresses of logical block addresses 2~3 | The physical address of LDA_1, pointing to 8 KB data |
| ... | ... | ... |
| 1023 | Physical addresses of logical block addresses 2046~2047 | The physical address of the LDA_1023, pointing to 8 KB data |
| ... | ... | ... |
| N | Physical address of logical block address 2N~(2N + 1) | The physical address of LDA_N, pointing to 8 KB data |
| ... | ... | ... |

The HMB space allocated by the system is usually not enough to store all L2P entries. For example, Windows 10 system usually allocates only 64 MB as HMB space. In order to realize HMB coverage for all L2P entries, all L2P entries are divided into a plurality of sections according to the HMB space size. Each section has a unique section number, which can cover a plurality of L2P table units. In one section, each L2P table unit calculates its intra-section offset (offset-in-section) address from its corresponding SLDA, and the offset-in-section of each L2P table unit is unique with the section. Since the L2P entries space is divided into a plurality of sections, this happens: two or more table units may belong to different sections, but they have the same offset-in-section in their respective sections. For the HMB to store table units with the same offset-in-section, each section is divided into 4 or 8 ways. For L2P table units with different section numbers and the same offset-in-section in the section, different way numbers can be used to differentiate the table units. The metadata contains the section number and the way number, so it can be used as an index for the L2P table unit. When a L2P table unit is written into the HMB, its corresponding metadata is also updated to the metadata table. Metadate includes section number and way number. When searching a L2P table unit, a quick search for the L2P table unit can be implemented by searching the metadata. The introduction of metadata enables the HMB space to store the L2P table unit corresponding to any section number and way number, so that the HMB can cover entire L2P table.

A metadata may only store a fixed quantity of ways (4 or 8). When the quantity of table units with the same offset-in-section to be stored exceeds the quantity of ways that the metadata can store, an existing table unit needs to be replaced to store the new table unit. Therefore, order numbers (or, sequence numbers) are introduced into the metadata to represent the age status of the L2P table units of the same offset-in-section. When the metadata that needs to be updated exceeds the quantity of ways that can be stored, replace the oldest (i.e., earliest written) L2P table unit and the metadata corresponding to the way number, and update the order numbers of other ways to be older respectively. Taking 4-way metadata as an example, the replacement rule for the sequence numbers is shown in Table 3 below. In Table 3, the sequence number 0 of the way number 3 is the oldest, so the new table unit replaces way number 3 and updates its order number to the newest 2. The sequence numbers of the way numbers 0, 1 and 2 are reduced by 1 respectively.

TABLE 3

Sequential replacement rule for the sequence numbers of way numbers

| Way number | Current sequence number | Updated sequence number |
|---|---|---|
| 0 | 3 | 2 |
| 1 | 2 | 1 |
| 2 | 1 | 0 |
| 3 | 0 | 3 |

At the same time, in order to realize the flexible management for the table units in the HMB by the FW, the replacement rule for the order numbers of the way numbers specified by the FW can also be defined. FW can specify the way number to be replaced, HW replaces the table unit of the way number and updates the sequence number of the metadata. Taking 4-way metadata as an example, the replacement rule for the sequence numbers of the way numbers specified by FW is shown in Table 4 below. In Table 4 below, FW specifies to replace way number 1, so the new table unit replaces way number 1 and updates its sequence number to the newest 2. The sequence number that is newer than the way number 1 (in this case, way number 0), and its sequence number is reduced by 1. The sequence numbers that are older than the way number 1 (in this case, way number 2, 3), and their sequence numbers remain unchanged.

TABLE 4

Specified replacement rule for the sequence numbers of way numbers

| Way number | Current sequence number | Updated sequence number |
|---|---|---|
| 0 | 3 | 2 |
| 1 | 2 | 3 |
| 2 | 1 | 1 |
| 3 | 0 | 0 |

Based on the above description, the metadata consists of the sequence number, the way number and the section number, and a valid bit is added. Take the HMB divided into 256 sections and each section containing 4 ways as an example, the metadata is defined as the format in Table 5 below:

TABLE 5

Composition of the metadata

| Bit number | Description |
|---|---|
| [12] | Valid bit of the metadata. After the system is initialized, this bit is 0, which means it is invalid. |
| [11:10] | Sequence number of the table unit<br>00: the table unit is the oldest.<br>01: the table unit is sub-old.<br>10: the table unit is sub-new.<br>11: the table unit is newest. |
| [8] | The way number of the table unit in its related section.<br>00: way No. 0<br>01: way No. 1<br>10: way No. 2<br>11: way No. 3 |
| [7:0] | The section number of the table unit<br>00: section number 0<br>01: section number 1<br>. . .<br>FF: section number 255 |

Figure 2:
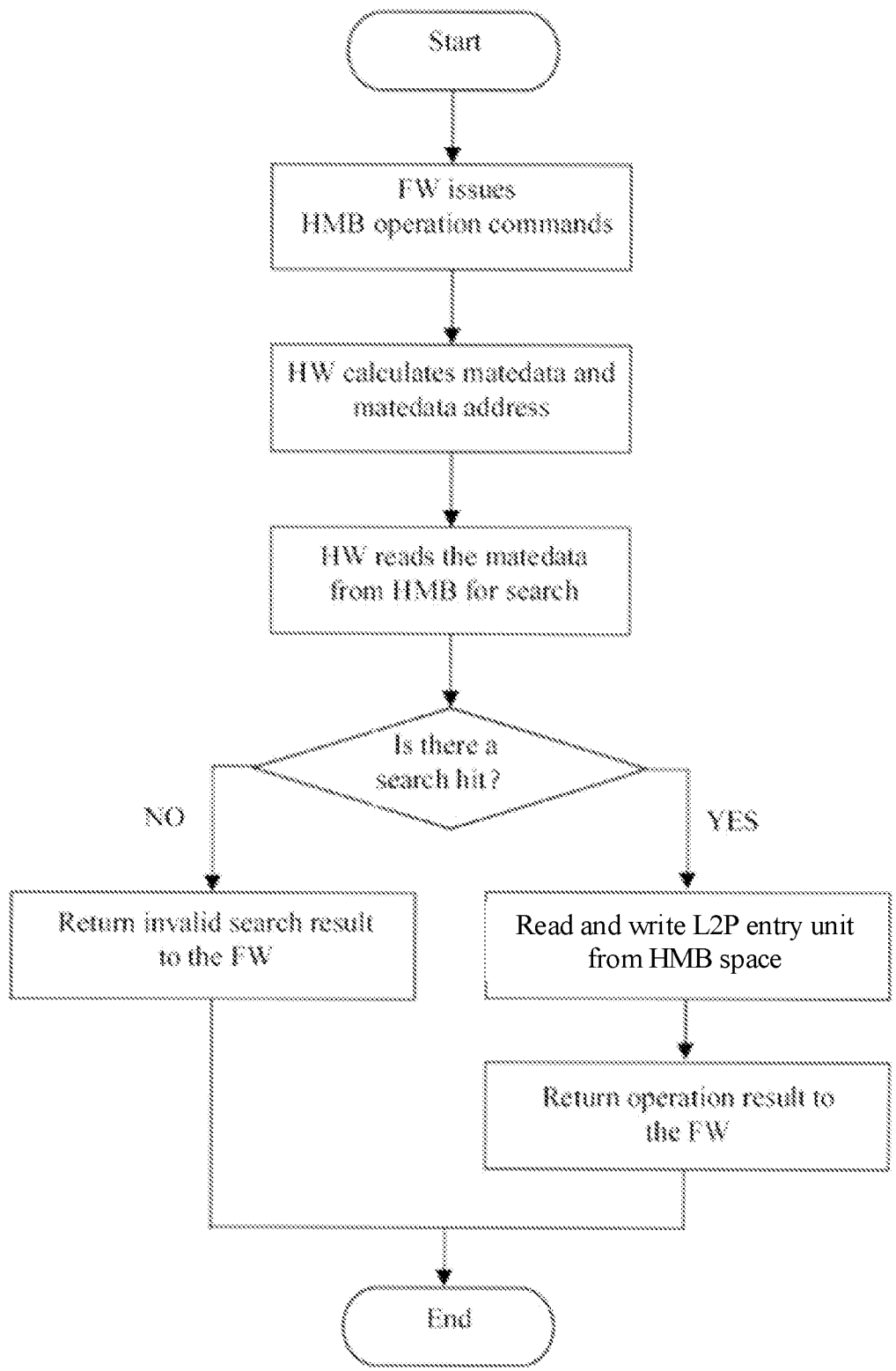
FIG. 2 is a schematic operation process for the HMB cache in one embodiment of the present application.
Figure 3:
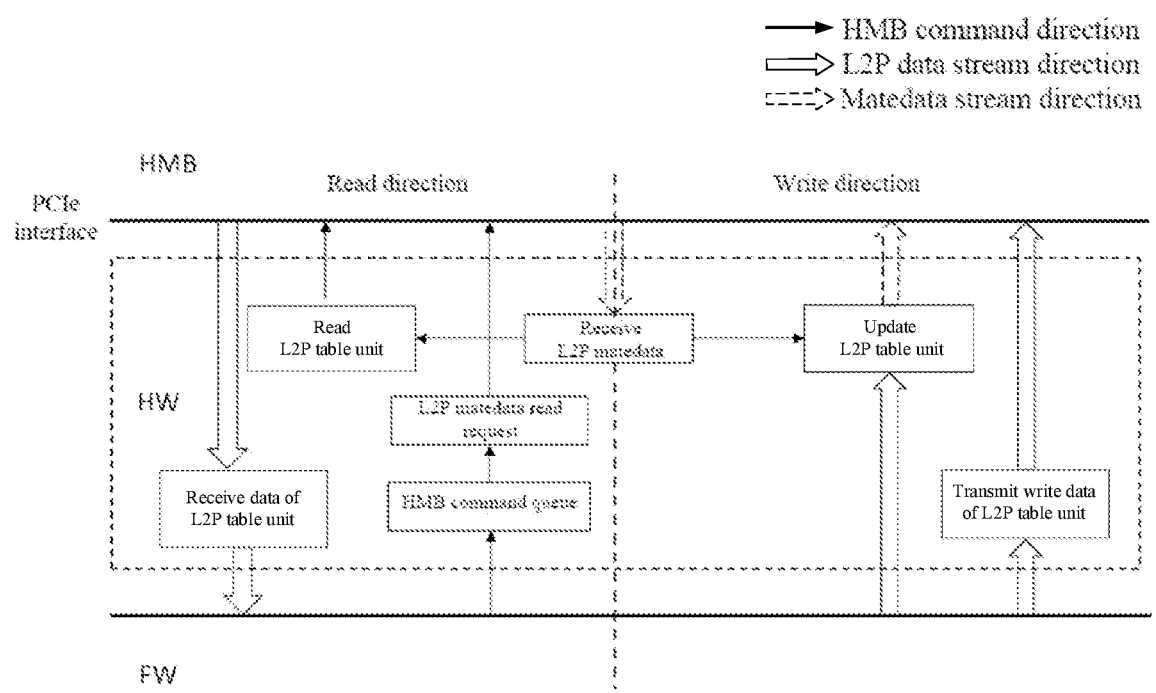
FIG. 3 is a schematic data stream for the HMB cache in one embodiment of the present application.

FIG. 2 shows the operation process of the HMB cache in one embodiment. FIG. 3 shows the data stream of the HMB cache in one embodiment. The entry operation instruction of the HMB is initiated by FW, and HW completes the entry operation and metadata operation. The operation instructions of the HMB cache are defined in Table 6 below. FW can propose the following instructions: write instruction to read the L2P table unit from SRAM and write it into the HMB; read instruction to read the L2P table unit from the HMB and write it into the SRAM; search instruction to search L2P table unit in the HMB; replace instruction to replace L2P table unit in the HMB with new table unit. In order to realize the above operations, the following HMB operation instructions are defined. In these instructions, FW needs to provide SLDA corresponding to L2P entry or table unit, HW calculates metadata according to the SLDA, and then locates the entry or table unit through searching the metadata for reading, writing, searching or replacing operations. A dedicated space may be allocated in the HMB for storing metadata. HW can search, calculate and update metadata.

TABLE 6

Operation instructions for the HMB cache

| Content | Description |
|---|---|
| LDA quantity | The quantity of LDA specified for operation |
| Instruction code | Operation instructions representing different L2P entry or table unit, including operations such as read, write, search, and replace. |
| Way number | Used for updating L2P entry, including writing and replacing, specify way number to update. |
| Namespace | Specify the namespace for the HMB operation instruction |
| SLDA | The starting LDA address of the L2P entry or L2P table unit |
| PDA | The PDA used for replacement, only used in replace instructions. Replace the previous PDA corresponding to the SLDA with this PDA to achieve the purpose of updating L2P entry. |

TABLE 6-continued

Operation instructions for the HMB cache

| Content | Description |
|---|---|
| SRAM start address | Used for read and write instruction for L2P table unit. Specify the SRAM start address in the host controller to store an L2P table unit. For read instruction, the host controller reads the L2P table unit from the HMB cache and writes it into the memory space pointed to by the SRAM start address. For write command, the host controller reads the L2P table unit from the memory space pointed to by the SRAM start address and writes it into the HMB cache. |

HW reads metadata from HMB space for search. The search for metadata has two results: "hit" or "miss". If the search result is "hit", it means that the table unit corresponding to the metadata already exists in the HMB. If the search result is "miss", the table unit corresponding to the metadata does not exist in the HMB. For write and replace instructions, HW needs to update the corresponding metadata after writing the new L2P entry or table unit into the HMB. For read and search instructions, HW does not need to update metadata. The data results of the HMB cache search results are shown in Table 7 below.

TABLE 7

Search results of the HMB cache

| Content | Description |
|---|---|
| Cache hit status | Represents whether the cache's search hit. |
| PDA quantity | Indicates PDA quantity obtained by the search instruction. |
| Result code | Represents operation results of different L2P entries or table units, including the results of operations such as read, write, search, and replace. |
| Error code | When an error occurs during the read to the HMB cache, such as a PCIe link error, this code indicates that the HMB operation result is not available. |
| PDA | The PDA obtained by the search command. |
| SRAM start address | Used for read and write instruction for L2P table unit. Specify the SRAM start address in the host controller to store an L2P table unit. For read instruction, the host controller reads the L2P table unit from the HMB cache and writes it into the memory space pointed to by the SRAM start address. For write command, the host controller reads the L2P table unit from the memory space pointed to by the SRAM start address and writes it into the HMB cache. |

Namespaces are a series of non-volatile memories that can be formatted as logical blocks. After being formatted, the namespace is a set of logical blocks with size N, the logical block size can be different, and the logical block address ranges from 0 to N−1 (N is the logical space size). NVMe controllers can support the use of multiple namespaces, distinguished by namespace IDs. The HMB space allocated by the host is a single logical space.

In the present disclosure, the HMB space is divided into a plurality of HMB subspaces corresponding to different namespaces, and each subspace includes a plurality of storage logic subblocks for storing metadata, table units, user data, and data integrity check code, etc. respectively. Each subblock corresponds to a different HMB starting address, and the starting address of each block is recorded by hardware registers. In this way, the HMB space can be used to store multiple types of data at the same time, each of which is stored in different logical subblocks. For example, the HMB can store L2P entries, used as entry cache, and can store metadata, user data, and data integrity check code, etc.

Dividing the HMB into logical subblocks can also enable HMB to support multiple namespaces. When operating on the L2P entry of the namespace, the corresponding namespace ID is provided in the HMB command. HW only searches or accesses the logical subblock according to the namespace ID and the HMB address corresponding to the space, and returns the operation result. In each logic al subblock of the HMB, different cache management rules can be defined to satisfy different needs of different namespaces. For a non-volatile memory, the space size, access speed and application scenario of different namespaces can be different. For example, a certain namespace can be allocated to a triple-level storage cell (TLC) with a large space and a slow access speed to store cold data that is less frequently used; a certain namespace can be allocated to multi-level storage cell (MLC) with a small space and a fast access speed to store hot data that is more frequently used. In the present disclosure, the namespace used to store cold data can be defined as a cache that supports multiple sections, and the namespace used to store hot data can be defined as a cache that supports a single section. In this way, when searching entries of cold data, the search result of HMB cache may be "hit" or "miss"; When searching for entries of hot data, the search result of HMB cache is always "hit". This improves the search speed of the L2P entry of the hot data.

Another embodiment of the present application further discloses a system of using HMB as physical address mapping table cache, the system comprises: a mapping entry division module, a table unit division module, a metadata calculation module, and a writing module. Wherein, the mapping entry division module is configured to arrange physical addresses in the order of logical addresses, wherein physical address mapping entries corresponding to a plurality of consecutive physical addresses form one table unit, and a logical address corresponding to a first entry of each table unit is used as an index of the table unit. The table unit division module is configured to determine HMB size, and divide all table units into a plurality of sections according to the HMB size, wherein each section comprises a plurality of table units, and each section is divided into a plurality of ways. The metadata calculation module is configured to calculate a metadata according to logical address corresponding to the first entry of the table unit to be stored and the HMB size, wherein the metadata comprises a section number and a way number, the section number is the modulo result of dividing the logical address by the HMB size, the remainder of the modulo result is the offset-in-section, and the way number is the modulo result of dividing the offset-in-section by way size. The write module is configured to write the metadata and the table unit to be stored into the HMB.

Correspondingly, the embodiments of the present disclosure also provide a computer storage medium in which computer-executable instructions are stored. When the computer-executable instructions are executed by a processor, the method embodiments of the present application are implemented. Computer-readable storage media comprise permanent and non-permanent, removable and non-removable media can be any method or technology to achieve information storage. Information can be computer-readable instructions, data structures, modules of programs, or other data. Examples of a storage medium of a computer include, but are not limited to, Phase Change Memory (PRAM), Static Random Access Memory (SRAM), Dynamic Random Access Memory (DRAM), Other Types of Random Access Memory (RAM), Read Only Memory (ROM), Electrically Erasable Programmable Read Only Memory (EEPROM), Flash Memory or other Memory Technology, Read Only Disc Read Only Memory (CD-ROM), Digital Versatile Disc (DVD) or other optical storage, Magnetic Tape Cassette, Magnetic tape magnetic disk storage or other magnetic storage device or any other non-transmission medium that can be used to store information that can be accessed by a computing device. As defined herein, computer-readable storage media do not include temporary computer-readable media, such as modulated data signals and carrier waves.

It should be noted that in the application documents of the present patent, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In the application file of this patent, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

All documents referred to in this specification are deemed to be incorporated in their entirety in the disclosure of this specification so as to serve as a basis for modifications where necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition the processes described in the drawings do not necessarily require a particular order or successive order shown to achieve the desired results. In some embodiments, multitasking and parallel processing are also possible or may be advantageous.

What is claimed is:

1. A method of using HMB as a cache of physical address mapping table, comprising:
   arranging physical addresses in the order of logical addresses, wherein physical address mapping entries corresponding to a plurality of consecutive physical addresses form one table unit, and a logical address corresponding to a first entry of each table unit is used as an index of the table unit;
   determining HMB size, and dividing all table units into a plurality of sections according to the HMB size, wherein each section comprises a plurality of table units, and each section is divided into a plurality of ways;

calculating a metadata according to logical address corresponding to the first entry of the table unit to be stored and the HMB size, wherein the metadata comprises a section number and a way number, the section number is the modulo result of dividing the logical address by the HMB size, a remainder of the modulo result is the offset-in-section, and the way number is the modulo result of dividing the offset-in-section by way size; and writing the metadata and the table unit to be stored into the HMB.

2. The method of claim 1, wherein the metadata further comprises a write sequence number which indicates a write order of the table unit and the corresponding metadata, and when writing the metadata and the table unit to be stored into the HMB, replacing the metadata in the HMB corresponding to the write sequence number which indicates the metadata is earliest written and the table unit corresponding to the metadata, and updating the write sequence numbers of all metadata.

3. The method of claim 2, wherein the write sequence number comprises {0, 1, 2, 3}, wherein 0 indicates that the metadata is earliest written and will be replaced at the next time of writing, and 3 indicates that the metadata is most recently written.

4. The method of claim 1, wherein the metadata further comprises a write sequence number which indicates a write order of the metadata, and when writing the metadata and the table unit to be stored into the HMB, specifying to replace the metadata in the HMB corresponding to a specific way number and the table unit corresponding to the metadata, and updating the write sequence numbers of all metadata.

5. The method of claim 4, wherein updating the write sequence number of the metadata corresponding to the specified specific way number to a write sequence number which indicates the metadata is most recently written, and decreasing the write sequence number corresponding to the metadata written later than the metadata corresponding to the specified specific way number by 1 respectively, and keeping the write sequence number corresponding to the metadata written earlier than the metadata corresponding to the specified specific way number unchanged.

6. The method of claim 1, wherein generating metadata according to the logical address corresponding to a mapping address entry to be searched or read or the logical address corresponding to the first entry of the table unit to be searched or read, and searching the metadata in the HMB, and returning the mapping entry corresponding to the metadata while there being a matching metadata.

7. The method of claim 1, wherein the HMB is divided into a plurality of subspaces corresponding to different namespaces, wherein each subspace of the HMB comprises a plurality of storage logic subblocks for storing metadata, table units, user data, and data integrity check code.

8. The method of claim 1, wherein the HMB is divided into a plurality of subspaces corresponding to different namespaces, and the step of writing the metadata and the table unit to be stored into the HMB further comprises: determining the data corresponding to the metadata and the table unit to be stored is cold data or hot data, storing the metadata and the table unit to be stored in the subspaces of different namespaces according to the determining result of the cold data and the hot data, and dividing the subspace used to store the metadata and the entire table units to be stored corresponding to the hot data into one section, such that search hit rate of the hot data reaches 100%.

9. The method of claim 1, wherein physical address mapping entries corresponding to 1024 consecutive physical addresses form one table unit.

10. The method of claim 1, wherein all the table units are divided into 1, 128 or 256 sections.

11. The method of claim 1, wherein each section is divided into 4, 8, or 6 ways.

12. A non-transitory computer-readable storage medium, wherein the computer-readable storage medium stores computer executable commands which are executed by a processor to implement the steps in the method of claim 1.

* * * * *